(12) United States Patent
Bensoussan

(10) Patent No.: US 8,552,886 B2
(45) Date of Patent: Oct. 8, 2013

(54) CRASH WARNING SYSTEM FOR MOTOR VEHICLES

(75) Inventor: Philippe Bensoussan, Vienne (FR)

(73) Assignee: BCS Business Consulting Services Pte Ltd., Faber HSE (SG)

( * ) Notice: Subject to any disclaimer, the term of this patent is extended or adjusted under 35 U.S.C. 154(b) by 395 days.

(21) Appl. No.: 12/927,841

(22) Filed: Nov. 24, 2010

(65) Prior Publication Data

US 2012/0126997 A1 May 24, 2012

(51) Int. Cl.
  *G08G 1/09* (2006.01)
(52) U.S. Cl.
  USPC .......................................................... 340/905
(58) Field of Classification Search
  USPC ............ 340/901, 905, 426.16, 436, 438, 463; 701/301, 9
  See application file for complete search history.

(56) References Cited

U.S. PATENT DOCUMENTS

| 5,734,320 | A * | 3/1998 | Suzuki ........................... 340/473 |
| 6,081,188 | A | 6/2000 | Kutlucinar et al. |
| 6,615,137 | B2 * | 9/2003 | Lutter et al. .................... 701/301 |
| 7,523,000 | B2 | 4/2009 | Tengler et al. |
| 8,068,016 | B2 * | 11/2011 | Toh ............................ 340/425.5 |
| 2007/0063824 | A1 * | 3/2007 | Gaddy et al. ............. 340/426.21 |
| 2008/0055068 | A1 | 3/2008 | Van Wageningen et al. |
| 2008/0275618 | A1 | 11/2008 | Grimm et al. |
| 2009/0189754 | A1 * | 7/2009 | Hochrein ....................... 340/436 |
| 2010/0020169 | A1 | 1/2010 | Jang et al. |
| 2010/0114418 | A1 * | 5/2010 | Samuel et al. .................... 701/29 |
| 2010/0114467 | A1 * | 5/2010 | Samuel et al. .................. 701/119 |
| 2010/0134271 | A1 | 6/2010 | Edwards et al. |

FOREIGN PATENT DOCUMENTS

| EP | 1 149 371 B1 | 5/2007 |
| WO | WO 2009/140514 A2 | 11/2009 |
| WO | WO 2010/055509 A1 | 5/2010 |
| WO | WO 2012/071054 A3 | 5/2012 |

OTHER PUBLICATIONS

International Search Report, PCT/US2011/001837, dated Jun. 1, 2012.
*Crash Warning for Connected Cars?*, ICT Results, at http://ec.europa.eu/information_society/activities/policy_link/documents/ict_results_factsheets/reposit.pdf (visited Sep. 27, 2010).
*Features that prevent crashes*, NZ Transport Agency, http://210.48.109.8/vehicle/choosing/features-prevent.html (updated Dec. 1, 2009) (visited Sep. 27, 2010).

(Continued)

*Primary Examiner* — Phung Nguyen
(74) *Attorney, Agent, or Firm* — TraskBritt, P.C.

(57) ABSTRACT

A system adapted to provide a warning to a motorist that a nearby vehicle has been in an accident. Embodiments include a crash detector operable to detect a crash of a vehicle, a transmitter to transmit a warning signal (typically, radio frequency) from the crashed vehicle, a receiver to receive a transmitted crash warning signal, and a display to warn the operator of an approaching vehicle of the crash. Some embodiments incorporate feedback from a vehicle's air-bag deployment circuitry to provide a trigger effective to broadcast the crash warning signal. Desirably, the operator of an approaching vehicle is provided with at least one, if not both, of a visual and an audible warning signal. Certain embodiments provide such audible and/or visual warning to approaching vehicles via the transmitted warning signal and a display and/or speaker carried in the approaching vehicle. Sometimes, audible and visual warnings may be transmitted directly from the crashed vehicle.

15 Claims, 3 Drawing Sheets

(56) References Cited

OTHER PUBLICATIONS

*Car tech: Building the zero fatality car*, Computerworld, http://www.computerworld.com/s/article/print/9179697/Car_tech_Building_the_zero_fatalitf_car, Aug. 5, 2010 (visited Sep. 27, 2010).

*A Shake May Prevent a Crash*, Science Now, http://news.sciencemag.org/sciencenow/2009/05/26-02.html, May 26, 2009.(visited Sep. 27, 2010).

\* cited by examiner

CRASH WARNING SYSTEM FOR MOTOR VEHICLES

TECHNICAL FIELD

The invention relates to warning devices. Preferred embodiments are adapted to detect occurrence of an accident involving a motor vehicle, and then immediately broadcast a warning of such event to motorists in the vicinity of the accident.

BACKGROUND

A number of United States patents and patent applications disclose structure and technology related to warning devices and systems that can be employed in a mobile environment. For example, U.S. Pat. No. 7,523,000, filed Oct. 11, 2005, describes a system of communication among cars, stationary towers, and satellites. When a rear-end collision is predicted, the vehicle in front accelerates to avoid the collision.

United States utility patent application Serial No. US 2008/0055068 A1, filed Jul. 22, 2005, describes broadcasting warning messages among mobile nodes. A communication device senses a danger and triggers at warning message to be forwarded to neighboring vehicles. Received messages may be retransmitted to other vehicles. United States utility patent application Serial No. US 2010/0134271 A1, filed Dec. 1, 2009, describes a visual warning system from one car to another. A driver who sees a hazard can press a button. An indicator outside his car will then illuminate; other drivers who see the indicator will then know of the hazard, and can plan accordingly. The warning may also be transmitted wirelessly; drivers who have similarly equipped cars may receive an in-car warning even when they cannot see the other car's indicator.

United States utility patent application Serial No. US 2010/0114467 A1, filed Nov. 6, 2008, describes a vehicle with sensors to determine when nearby vehicles have crashed, by determining that their speeds fall outside of normal ranges. This information may then be transmitted to other vehicles by V2V (vehicle to vehicle) communications or by flashing lights. United States utility patent application Serial No. US 2010/0114418 A1, filed Nov. 6, 2008, describes a vehicle with sensors to determine when nearby vehicles have crashed, by determining their movement outside of normal traffic lanes. This information may then be transmitted to other vehicles by V2V (vehicle to vehicle) communications or by flashing lights.

United States utility patent application Serial No. US 2010/0020169 A1, filed May 15, 2009, describes a system that communicates with other vehicles. When a collision is predicted based on speed data from other vehicles, the system directs the driver where to go (e.g., change lanes) to avoid collision. United States utility patent application Serial No. US 2007/0063824 A1, filed Aug. 18, 2005, describes a system that can receive data from road construction transmitters, emergency vehicle transmitters, or other vehicles concerning road hazards. The system can also repeat signals to other vehicles. United States utility patent application Serial No. US 2008/0275618 A1, filed May 4, 2007, describes an alert system to warn drivers when vehicles ahead are moving more slowly than normal. The vehicles transmit their speed data to each other (V2V).

Very smart people from around the world have also contributed to advancement of structure and technology that may be related to certain embodiments of the present invention. For example, European Patent Specification No. EP 1 149 371 B1, filed Feb. 3, 2000, describes a system of changing speed limits and speed bump size remotely and reporting collision information to first responders, traffic enforcement, etc. Communication is from a fixed point on or near a road to police, then to specific mobile officials as necessary.

International Publication WO 2009/140514 A2, with a priority date of May 16, 2008, describes a fleet of vehicles communicating with one another. Follower vehicles operate autonomously based on data from the leader vehicle. International Publication WO 2010/055509 A1, with a priority date of Nov. 13, 2008, describes a vehicle subsystem that collects information about the state of the vehicle. Information is communicated with a remote central server, which also transmits hazard information back to the vehicle.

A number of articles and publications also describe relevant structure and technology. The article titled "A Shake May Prevent a Crash", Science Now, WorldWideWeb.news-.sciencemag.org/sciencenow/2009/05/26-02.html, May 26, 2009, describes using radar or lasers to detect impending collisions, then warning drivers via tactile warnings. The article titled "Car tech: Building the zero-fatality car", Computerworld, WorldWideWeb.computerworld.com/s/article/print/9179697/Car_tech_Building_the_zero_fatality_car, Aug. 5, 2010, describes sending out a "safety state—for example, the car's speed, the level of brake pressure the driver has applied and steering—to every other car in the vicinity." Similarly, the article "Crash Warning for Connected Cars?", ICT Results, WorldWideWeb.ec.europa.eu/information_society/activities/policylink/documents/ict_results_factsheets/reposit.pdf, describes connected cars sharing their position, speed, and trajectory. A car receiving such data can then calculate the vehicles' relative positions to predict collisions. The publication "Features that prevent crashes", NZ Transport Agency, http://210.48.109.8/vehicle/choosing/features-prevent.html, Dec. 1, 2009, describes collision warning and avoidance systems that depend on a supporting network within the road system.

All of the preceding documents are hereby incorporated by reference, as though set forth in this document in their entirety, for their disclosures of structure and technology relevant to the instant disclosure.

BRIEF SUMMARY

The invention may be embodied as a crash warning system adapted to give motorists an advance warning that a nearby vehicle has been in an accident. An exemplary such warning system includes a first accident detector structured to be carried on board a first motor vehicle. Broadly, a workable accident detector is adapted to detect an accident involving the first motor vehicle and to consequently cause a first output. A currently preferred accident detector includes a crash-detecting component of the first motor vehicle's air-bag deployment controls. Sometimes, a first accident detector is disposed in-circuit to receive an input from a component of air-bag deployment circuitry of the first motor vehicle. In such case, deployment of a vehicle's air-bag may also generate a signal determining that a crash has occurred to the vehicle. It is within contemplation to provide one or more crash detectors arranged to detect a crash that occurs from any point of the compass, including from the front, side, or rear of a vehicle.

The exemplary system also includes a first transmitter disposed in communication with the first accident detector and operable to broadcast a first remote warning signal subsequent to receiving the detector's first output. In the event that the first vehicle experiences a sufficiently significant crash, the first remote warning signal is broadcast for reception by compatible crash warning systems carried in nearby vehicles. One determination of a sufficient level of significance is defined as a crash wherein an air-bag is deployed.

A first exemplary remote warning transmitter may be embodied as a warning light structured to be carried on board the first motor vehicle and adapted to broadcast a warning light output responsive to an output of the first accident detector. A workable light output is configured to be visible to an occupant of an approaching vehicle. One such warning light is adapted to be carried on top of the roof of the first motor vehicle. An operable warning light may include one or more element selected from the group including a brake light; a turn signal; and a headlight; of the first motor vehicle.

A second exemplary remote warning transmitter may be embodied as an alarm structured to be carried on board the first motor vehicle and adapted to broadcast an audible warning, for perception of the audible warning by an occupant of an approaching motor vehicle. A workable alarm includes a loud speaker, or a siren.

A third exemplary remote warning transmitter may be embodied as a broadcasting device, such as a radio frequency or radar transmitter. In general, a remote warning transmitter is operable to convey warning information from a crash site to a remote site. Preferably, a remote warning transmitter is operable responsive to an actuating output of an associated accident detector. One or more remote warning signal may be substantially simultaneously broadcast from embodiments of crash warning systems within contemplation.

The exemplary system also includes a first receiver structured to be carried on board the first motor vehicle and operable to receive a second remote warning signal that is transmitted by a different crash warning system carried by a nearby vehicle. The exemplary system further includes a first local warning device in communication with the first receiver and effective to communicate a warning to an occupant disposed inside the first motor vehicle. The exemplary system is structured such that a remote warning signal from a different crash warning system causes a local warning, perceptible to an occupant of the first vehicle, to be conveyed by the first local warning device. By extrapolation, a remote warning signal broadcast from a remote accident site may cause a plurality of local warnings to alert operators of nearby vehicles of the remote accident.

An exemplary first local warning device includes a display screen on which a printed message may be displayed for observation by an operator of the first motor vehicle. Operable display screens include light emitting diode (LED), liquid crystal displays (LCD), cathode ray tube (CRT) devices, and the like. Desirably, the text message is presented in an attention-getting format, such as in a highly visible color. Sometimes, a first local warning device is structured to visually convey the instantaneous intensity, selected from a range of intensity, of an attribute associated with a second signal. One exemplary local warning device is structured to determine and visually convey an approximate current state of intensity, selected from a plurality of different states of intensity, of an attribute associated with a received signal. For example, a distance between an approaching vehicle and an accident may be displayed by a plurality of lights, or a bar chart, or a picture of an analog dial and needle. In certain cases, a plurality of audible noises may be individually assigned to each one of the plurality of states of intensity, and a speaker may be associated with the warning device to broadcast one noise, selected from the noises and corresponding to the currently determined state, for audible perception of the one noise by an occupant of the first vehicle.

In certain cases, a crash warning system may include an over-ride control, or reset button, operable to stop broadcast of one or more signal, or to adjust an output of the warning system. In an exemplary case, the over-ride control is structured to be operable only after a first pre-programmed period of time has elapsed subsequent to first broadcast of a signal. Also, sometimes the transmission range for transmitted remote warning signal is adjustable based upon conditions disposed in the location of a crash. It is further within contemplation that a first transmitter carried in a nearby vehicle may be disposed in-circuit operably to rebroadcast a remote warning signal received from a crashed vehicle to extend the distance a signal is transmitted from a crash site.

As at least implied above, the exemplary system is adapted for use in cooperation with at least a second crash warning system. The second warning system is structured to be carried by a second motor vehicle to detect an accident involving the second motor vehicle and, consequently, broadcast a remote warning signal to warn occupants of nearby vehicles, such as the first vehicle. A plurality of crash warning systems may be carried in a corresponding plurality of different vehicles. Desirably, such plurality of crash warning systems are at least compatibly arranged to broadcast, and receive, mutually compatible remote warning signals. In a best-case situation, every vehicle on the road would include a crash warning system able both to communicate a remote warning to nearby vehicles, and operably receive such a remote warning. Consequently, a broadcast remote warning signal would provide a local warning to each nearby vehicle in range to receive the remote warning signal.

The currently preferred crash warning system includes a crash detector, a transmitter, a receiver, and a local warning device. Such a system may be encompassed within one or more independent module that can be carried by a vehicle. Part of, or the entirety of, a crash warning system may be built-in to a vehicle, or connected to one or more component of the vehicle.

In general, a crash detector is any device operable to generate an input signal resulting from a crash involving a motor vehicle in which the crash detector is carried. A controller may be disposed in-circuit, to evaluate the significance of a crash before actuating a transmitter. Desirably, the crash is first evaluated, and determined to be above a certain threshold, before the crash warning system is actuated. A currently preferred crash detector includes a component of an air-bag deployment control assembly of the motor vehicle. In such case, the crash detector can be structured to cause an input signal to a controller, or an actuation signal to a transmitter, responsive to a trigger caused by air-bag deployment resulting from the crash.

The transmitter is disposed in communication with the crash detector. In general, an operable transmitter can broadcast a remote warning signal directed to nearby traffic. Certain remote warning signals include signals that are directly perceptible to humans, such as loud sounds and visible lights. A loud sound signal may be broadcast by an alarm, such as a loud speaker or siren. A workable visible light signal may be cast from a dedicated warning light. A currently preferred warning light is carried on the roof of the vehicle and permits observation of broadcast light from all points of the compass. Certain warning light arrangements may include a headlight, turn light, or break light as a broadcasting device. Another remote warning signal within contemplation includes a signal that can be broadcast from a crashed vehicle for reception by a receiver and subsequent input to a local warning device carried in one or more nearby vehicle. Exemplary such broadcastable signals include radar and radio frequency signals.

The receiver is structured to receive a remote warning signal from a different crash warning system. A local display device in communication with the receiver is effective to communicate a local warning, corresponding to the remote warning signal, to an occupant of the motor vehicle. A preferred display device is structured to visually convey an intensity of a parameter, such as an estimate of the distance to a crash site. Sometimes, a plurality of audible noises are individually assigned to a corresponding plurality of discrete parameter values. In such case, a speaker may be employed to broadcast the noise corresponding to the currently displayed parameter value.

BRIEF DESCRIPTION OF THE DRAWINGS

In the drawings, which illustrate what are currently regarded as the best modes for carrying out the invention.

DETAILED DESCRIPTION OF THE ILLUSTRATED EMBODIMENTS

Provided is an apparatus (or "system") adapted to warn motorists that an accident, or crash, involving another motor vehicle has occurred in their vicinity. Embodiments thereof may be structured in modular form for convenient aftermarket installation in a vehicle, or as an Original Equipment Manufactured (OEM) component or system.

Figure 1:
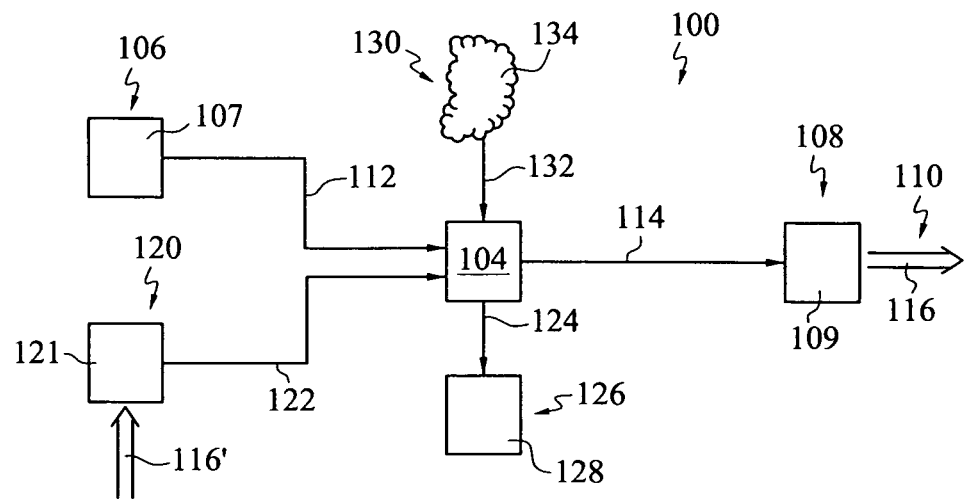
FIG. 1 is a schematic view representing elements of an assembly constructed according to certain principles of the instant disclosure.

A first currently preferred embodiment adapted to be carried by a motor vehicle is indicated generally at 100 in FIG. 1 and includes a controller 104 in communication with a crash detector, generally indicated at 106 and a remote signal transmitter, generally indicated at 108. Desirably, a remote signal transmitter 108 is capable of broadcasting some sort of a remote warning signal 110 to provide a warning to operators of other vehicles in the vicinity of a detected crash. Operable remote warning signals 110 encompass visible, audible, and other transmittable signals, such as radar, or radio frequency (RF) signals. One currently preferred remote signal transmitter 108 is embodied as a low-power radio frequency transmitter 109. As one example, it is within contemplation to apply the open source Class 1 Bluetooth protocol, which has a maximum permitted power of 100 mW and a range of about 100 meters, to a remote signal transmitter 108.

A workable crash detector 106 is operable to pass an informational signal to a controller 104 responsive to a vehicle crash. It is currently preferred for a crash detector 106 to incorporate one or more sensor components already present in a significant number of automotive vehicles. The currently preferred crash detector includes a crash-detecting element 107, such as may be used in a vehicle's air-bag deployment system.

There are several types of crash-detecting sensors in commercial use in air-bag deployment systems. Commercially available crash sensors conventionally include electrical, combinations of mechanical/electrical, or mechanical systems of operation. For examples, some vehicles have "spring and mass" crash sensors in which a spring-loaded weight is deflected by an impact effective to close a switch. Some newer vehicles have solid state crash sensors that contain either a piezoelectric crystal, or a micromachined accelerometer chip, that produces an electrical signal when sufficiently jolted. Sensors that close switches, open switches, or generate an electric signal responsive to a crash may easily be adapted to provide an informational signal to a controller that a crash has occurred.

Certain vehicles include self-contained mechanical air bag systems that trip a firing pin when jostled by a crash. The firing pin typically ignites a primer to fire the propellant used to inflate the air-bag. Even a sensor of the mechanical type may be configured as a crash detector 106 to produce an electrically based informational output signal 112 or 114 responsive the deployment of an element such as: the firing pin configured also to function as an electrical switch; temperature sensor disposed to measure the propellant; pressure sensor inside an air-bag; or the like. In any event, a signal may be obtained from a variety of sensor element types for use as either an informational input 112 to a controller, or sometimes as a direct command input 114 to a remote signal transmitter 108. Put another way, an accident detector 106 may be characterized as causing an output, such as signal 112 or signal 114, effective to cause a transmitter, such as transmitter 108, to broadcast a remote warning signal.

One common air-bag impact or crash sensor employs a ball confined inside an upwardly slanting tube having an electrical contact disposed at the elevated end of the slanted tube. A small magnet exerts a restraining force on the ball at the bottom of the incline, which force must be overcome by the deceleration effected by a crash. When a crash having a magnitude large enough to cause sufficient deceleration occurs, the ball rolls up the incline to make contact with, and close, the electric switch. Gas damping may be incorporated to further resist the ball from rolling up the incline. The ball typically rolls back to the bottom of the sloping tube subsequent to the crash, and resets the sensor. In such a sensor, an informational signal 112 or command signal 114 may be obtained indicating departure of the ball from its normally trapped position to the extent that the crash-detection switch is closed. When that switch is closed, a resulting electrical signal may be obtained and used, for example, as an informational signal 112 in a crash warning system 100.

Another common crash sensor is the "Rolamite" design by TRW, which includes a small metal roller that rolls forward under sudden deceleration to trip a switch. Such sensors may provide an electrical informational signal 112 when the tripped switch is closed, or sometimes even when a different switch is opened, i.e. indicating the roller element is off from its normally occupied position.

In many cases, a safety sensor, or arming sensor, is incorporated into an air-bag control module of an air-bag deployment system to reduce false air-bag deployment, i.e. due to a slow-speed fender-bender, or the like. Such safety sensor may be located at a different position, typically in the passenger compartment and farther away from the likely crash impact site, than the crash detecting sensor. The air-bag control module essentially requires proper signals from both of the crash detection sensor and the arming sensor before permitting deployment of the air-bag. Closing, or opening, a switch in such an air-bag control module during the course of an air-bag deployment operation may also produce a signal that can be used in parallel as either an informational signal 112 or a direct command signal 114. A stand-alone crash-detecting system having similar operational features may be incorporated in a crash warning system within contemplation.

Access to a signal that may be used for informational signal 112 or command signal 114 may be obtained by appropriately connecting a wire, or wires, to a switch portion of a crash detector, control module, or other source of such signal. It is within contemplation that an aftermarket crash warning system might simply plug into an On-Board Diagnostic (OBD) plug of a current or future industry standard. Of course, an OEM version of a crash warning system 100 may be built-in to a new vehicle, and include access to an appropriate sensor or control module within an OEM wiring harness. Alternatively, an aftermarket wire may be operably connected directly to a crash detector element, or module, of an OEM air-bag deployment system. Communication between a crash detector 106 and either, or both of, a controller 104 or remote warning signal transmitter 108 may also be provided using a wireless transmission protocol, such as the open source Class 3 Bluetooth protocol, which has a maximum permitted power of 1 mW and range of about 1 meter. In such case, inter-component transmission of a crash warning system disposed in one vehicle would be less likely to be accidentally received by an adjacent vehicle.

It is further within contemplation that one or more crash detecting sensor 106, dedicated solely to the crash warning system 100, may be used to provide one or more directionally based input signal 112, or command signal 114. Many crash detection sensors are substantially directional in their capability to detect crashes. For example, the rolling ball element will not be urged to travel up the tube's incline if an appropriate change in acceleration is not directed in sufficient agreement with the tube's axis. Most air-bag systems are configured to protect vehicle occupants from deceleration that causes a vehicle's occupants to hit the dashboard. Therefore, most crash sensors are oriented in agreement with a length axis of the vehicle. A plurality of crash sensors carried independently from the vehicle air-bag deployment system would permit deployment of a remote warning signal responsive to a side-impact crash, or even a rear-impact crash, which may not cause an air-bag to deploy. One workable arrangement includes a plurality of independent crash sensors carried in an aftermarket crash warning module to provide a plurality of directionally based input signals 112, or command signals 114.

It is further within contemplation that one or more independent crash sensor may be used in combination with a crash sensing element of a vehicle's air-bag deployment system. A workable such arrangement includes one or more independent crash sensor carried in an aftermarket crash warning module disposable in communication with an OEM air-bag deployment element effective to provide a plurality of directionally based input signals 112, or command signals 114. Such an independent sensor may be configured to detect a side-impact crash, and/or a rear impact crash, for examples.

A controller 104 may be embodied as any suitable intervening device operable to actuate a transmitter 108 subsequent to detection of a crash involving the vehicle 100. In some cases, a controller 104 may be embodied as part of a crash detector 106. In a first workable such example, a wire may be arranged directly to convey an input, such as presence or absence of an electrical signal, from a crash detector to a transmitter and thereby cause broadcast of a remote warning signal. However, it is currently preferred for a controller 104 to include structure capable of at least rudimentary decision making, such as a programmable logic controller (PLC), microprocessor, and the like. It is within contemplation for a controller 104 to be embodied in a microprocessing element already carried by a vehicle, such as a processing element used for emission control or operation and/or monitoring of some other vehicular system.

A currently preferred controller 104 is structured and arranged to receive and evaluate one or more input, such as input 112 from crash detector 106, before making an actuating output, or command signal, 114 effective to cause operation of a remote signal transmission device 108. An exemplary such case includes controller 104 receiving informational signal 112 from a crash detector 106, evaluating the signal 112 compared to a pre-programmed range of responses, and making a corresponding output signal 114 effective to cause broadcast of an RF warning signal 116 from RF transmitter 109.

Desirably, a crash warning system 100 also includes a receiver, generally indicated at 120, operable to receive a remote warning signal that is transmitted from a different crash warning system carried in a different motor vehicle. An exemplary receiver 120 includes an RF antenna 121 structured to receive an RF signal 116' that is transmitted by the other vehicle. Subsequent to receiving the signal 116', receiver 120 may pass its output 122 as an informational input 122 to controller 104. Consequently, controller 104 may make a command output 124 effective to cause operation of a local warning device, generally indicated at 126. An operable local warning device 126 is effective to communicate a warning to the operator of the motor vehicle in which a crash detector 100 is installed. An exemplary local warning device 126 includes a visual display device 128 on which text characters may be shown to communicate a message to an occupant of the vehicle in which a crash warning system 100 is carried. Alternative local warning devices may nonexclusively include audible and other visually perceptible systems.

It is within contemplation that a crash warning system 100 may include an additional apparatus, generally indicated at 130, effective to cause an input 132 for evaluation by the controller 104. For example, a user over-ride control, such as an on/off switch 134, may be actuated by a vehicle operator to turn off the system, or otherwise adjust an output of the system. In some cases, the controller may be provided with programming instructions to enable such over-ride only subsequent to elapse of a particular period of time subsequent to activation of the warning system 100. It is within contemplation to provide alternative apparatus 130 structured to permit a vehicle operator to transmit a text message to other drivers, or authorities.

Figure 2:
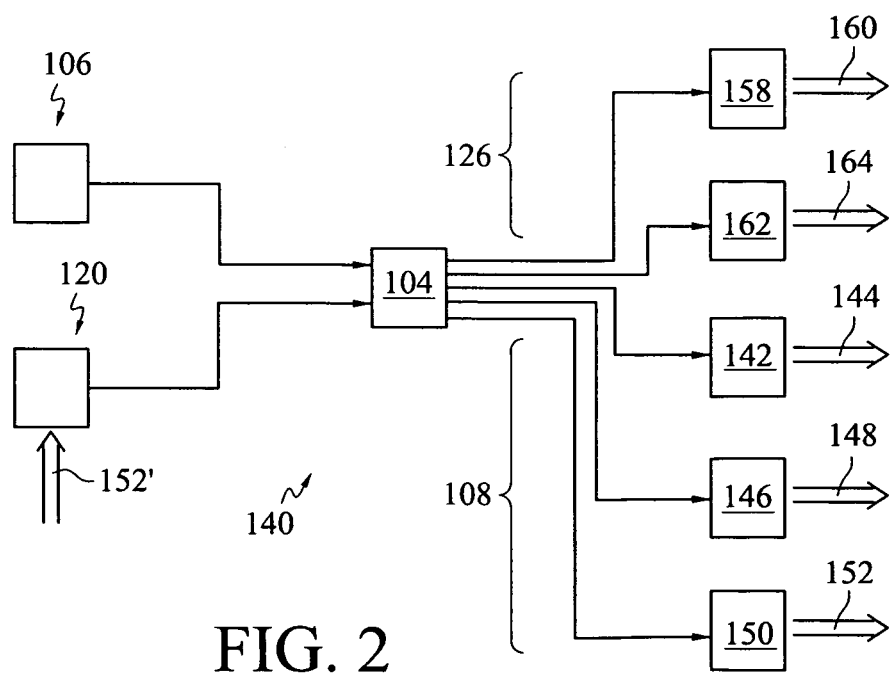
FIG. 2 is a schematic illustrating certain operable relationships between elements that may be included in an operable embodiment.

With reference now to FIG. 2, a second embodiment, generally indicated at 140, includes a crash detector 106 in communication through a controller 104 effective to operate a remote warning signal transmitter 108. As illustrated, a remote warning signal transmitter 108 may be embodied as one or more of: an alarm 142 operable to transmit a loud sonic signal 144 that is audibly perceptible to approaching traffic; a warning light 146 operable to transmit a warning signal 144 that is visibly perceptible to approaching traffic; and a transmitter 150 operable to transmit a remote warning signal 152 that may be received by a signal receiving apparatus 120 carried in an approaching vehicle.

Embodiment 140 also includes a receiver 120 in communication through controller 104 effective to operate a local warning device 126. A local warning device may be embodied as one or more of: a local display element 158 operable to transmit a local signal 160 that is visibly perceptible to an occupant of the vehicle; and a speaker 162 operable to cause a local sound output 164 that is audible to the occupant. Display elements 158 within contemplation nonexclusively include LED and LCD display panels, one or more light that can emit individually distinguishable colors, array of lights, bar graph, meter with rotating needle, and the like. It is currently preferred that an audible signal 164 is used in combination with a visual signal 160. It is also preferred for one or both of audible signal 164 and visible signal 160 to be configured to change in intensity (e.g. change in decibel level, color, amount of needle rotation, or bar length) responsive to distance between the receiver 120 and an accident site.

Figure 3:
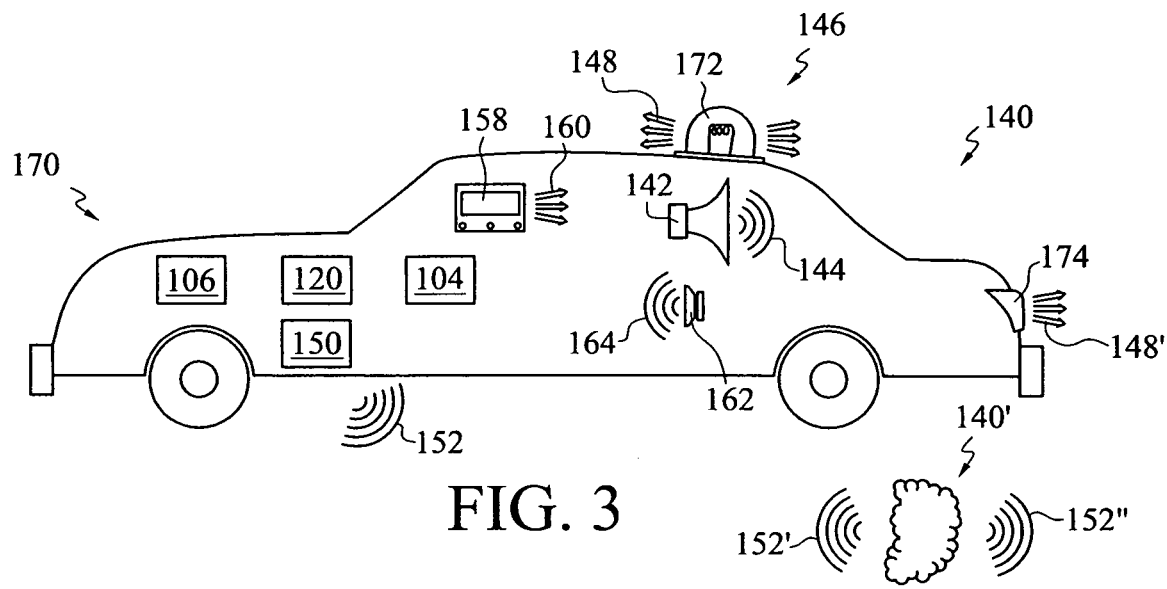
FIG. 3 is a schematic view in elevation representing an assembly constructed according to certain principles of the instant disclosure.

As illustrated in FIG. 3, an accident warning system, such as second embodiment 140, is typically adapted to be carried in an automotive vehicle, generally 170. In general, such automotive vehicle 170 may encompass cars, trucks, motorcycles, heavy transport vehicles, delivery vehicles, and the like. Again, certain crash warning systems 140 may be embodied as an OEM assembly that is built-in to a particular vehicle. Other crash warning systems 140 may be embodied as substantially modular component or assembly that can be connected, as appropriate, to one or more element carried by a vehicle. Preferably, one such element is associated with the air-bag deployment system of the vehicle. Certain crash warning systems may be embodied as modular stand-alone systems that can easily be transferred between vehicles.

With continued reference to FIG. 3, automotive vehicle 170 carries a controller 104 in communication with a crash detector 106 and a remote warning signal transmitter 150. When vehicle 170 is involved in a detectable crash, warning signal transmitter 150 broadcasts a remote warning signal 152 to operators of other vehicles in the local area of the crash. Additionally, alarm 142 may broadcast a remotely audible warning signal 144. An operable alarm 142 includes the vehicle's horn, although a special purpose noise maker or siren may be used alternatively, or in addition to the vehicle's horn.

Further, warning light 146 may broadcast a remote warning signal 148 that can be perceived by approaching motorists. In certain preferred embodiments, the device used to broadcast light signal 148 is structured to permit observation of the signal 148 from all angles of approach to the broadcasting vehicle. One such device includes roof-mounted beacon 172. However, it is within contemplation additionally, or alternatively, to incorporate one or more vehicle light 174 already carried by vehicle 170, such as a headlight, turn signal, and/or brake signal, as a broadcasting element for a visible signal 148'.

Still further, embodiment 140 includes a receiver 120 in communication with controller 104 and adapted to receive a signal 152' that is transmitted by a second embodiment 140' carried in another vehicle in proximity to vehicle 170. When signal 152' is forwarded by receiver 120 as an information signal that is received and interpreted by controller 104, a display 158 may be caused by controller 104 to emit an appropriate visible signal 160. Controller 104 may also, or alternatively, cause speaker 162 to emit an appropriate audible alert 164. It is within contemplation that one or more speakers present in the audio system of vehicle 170 may be used as speaker 162. Alternatively, a dedicated speaker may be included in an aftermarket modular embodiment of a crash warning system.

It is currently preferred for a transmitted remote warning signal 152 to be scalable in transmission power to effect a desired distance of signal transmission appropriate to the local operation of a vehicle 170 (e.g. city, mountain, country, etc.). Certain workable embodiment may include transmitters of remote warning signals 150 having a fixed transmission range. Therefore, it is currently preferred to employ a low-power RF transmitter, or low-power radar transmitter, such as deployed in certain automobile parking radar systems. It is within contemplation that an embodiment 140' may be adapted to receive signal 152 from a first embodiment 140, and subsequently rebroadcast such signal as retransmitted signal 152". In such an arrangement, the remote warning signal may be transmitted a greater distance, and provide additional time for an approaching motorist to prepare to arrive at the crash site. Of course, a feedback signal would ordinarily be included in such an arrangement, to prevent the signal 152 from being re-broadcast too far. It would not be beneficial to warn motorists that a crash has occurred 50 miles away, or to traffic travelling in a parallel direction but offset by 30 blocks in a direction transverse to a direction of travel toward the crash site. Such extreme range warning would not be helpful to a motorist receiving a multiple-times re-broadcast signal.

Figure 4:
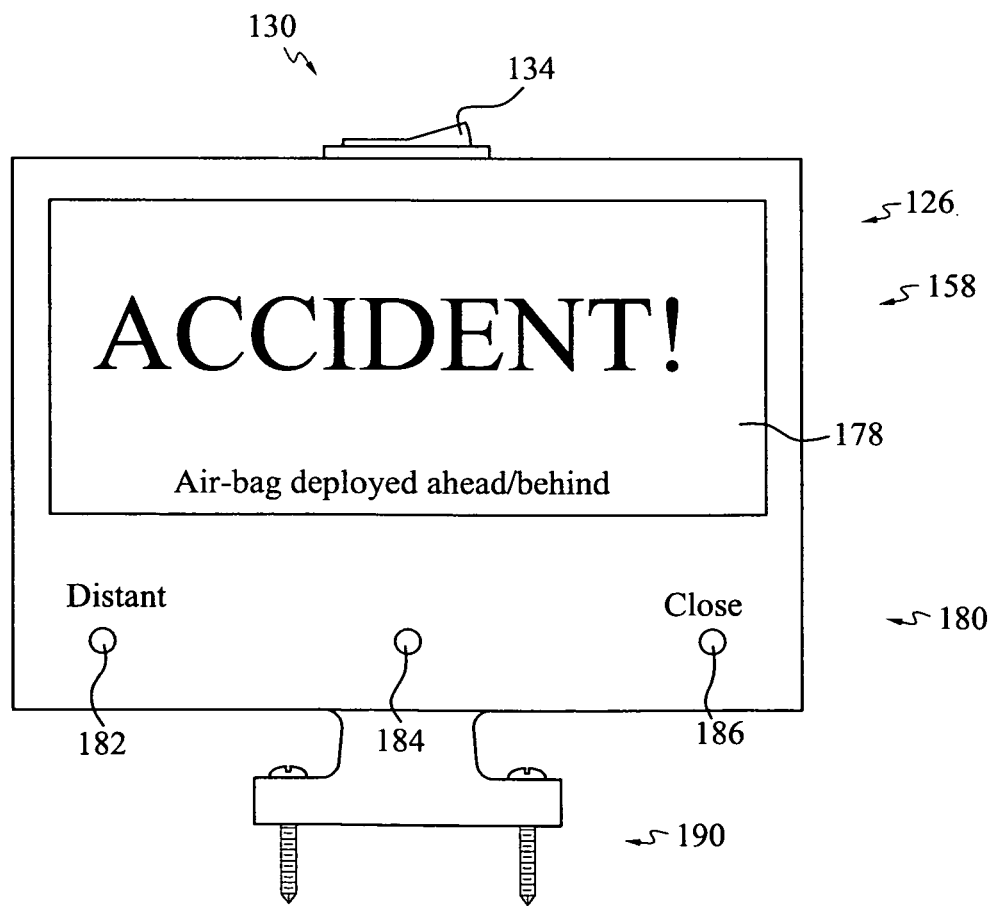
FIG. 4 is a front view in elevation of a workable display device operable in certain embodiments of the invention.

A currently preferred local display device 158 is illustrated in FIG. 4. Display device 158 includes a display panel 178 on which a text message and/or one or more indicator element may be indicated. Preferably, panel 178 can convey an appropriate text message to the operator of a vehicle in which the local display device 158 is carried. Messages within contemplation include simple warnings, such as "ACCIDENT!". Desirably, the text is displayed in an attention-getting color. Certain embodiments of display panel 178 may indicate more complicated messages. For one example, it is within contemplation that a receiver 120 may receive a signal that is broadcast from a traffic sign, and subsequently display a more complete message than can be perceived by a driver during a short interval during which such traffic sign is visible and decipherable. The driver may then review the message in more depth after passing the sign.

For a second example, detail about the accident location may be included, such as the accident is ahead of, or behind, the present vehicle. It is present preferred to include a display, generally indicated at 180, effective to indicate intensity of an attribute associated with a signal, such as distance to an accident. Intensity display 180 illustrated in FIG. 4 includes a yellow light emitting element 182, an orange light emitting element 184, and a red light emitting element 186. In such an arrangement, yellow element 182 may be enabled to indicate a distant accident. Similarly, orange element 184 and red element 186 may individually be enabled in appropriate sequence as the display 180 approaches the accident location. An alternative intensity display may be presented on a multipixle screen, such as a CRT, LCD, or LED screen, which can illustrate such parameter graphically, and in various forms such as: pie chart, bar chart, and picture of an analog dial with a rotating needle, among other viable alternatives.

It is currently preferred also, or alternatively, to cause a speaker 162 to emit a variable warning sound that may be changed to indicate intensity levels of a parameter, such as distance to the accident site. Sometimes a local warning device 126 may be encompassed within a modular embodiment of a system 140, and include display element 158 and a speaker 162.

FIG. 4 also illustrates one workable additional input apparatus 130 that is embodied as a toggle switch 134. Such switch 134 may be employed as an on-off switch, and/or as an over-ride control effective to terminate the output of one of more warning signal. Another alternative input apparatus 130 may include a device (e.g. keyboard, not illustrated) adapted to permit a vehicle occupant to input a text message for transmission of that message by a transmitting element 108.

Preferably, provision is made to anchor a local display 126 or 158 with respect to a vehicle in which such local display is carried. Anchoring means, generally indicated at 190, are therefore generally included. Workable anchoring means 190 nonexclusively include screws, as illustrated, or various adhesive arrangements; including decoupling arrangements, such as hook and loop fasteners, which permit transport of a system 126 between different vehicles; friction mounting arrangements, and other anchoring arrangements generally known in the art. Of course, certain embodiments may be incorporated in OEM installed systems, and can even by piggy-backed into certain devices, such as commercially available DVD playing systems already included in certain vehicles.

Figure 5:
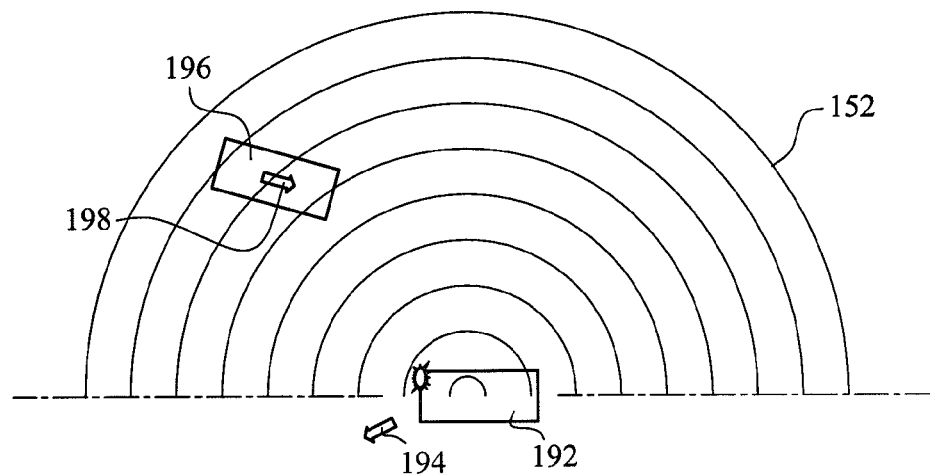
FIG. 5 is a first plan view of motor vehicles carrying embodiments of the invention.
Figure 6:
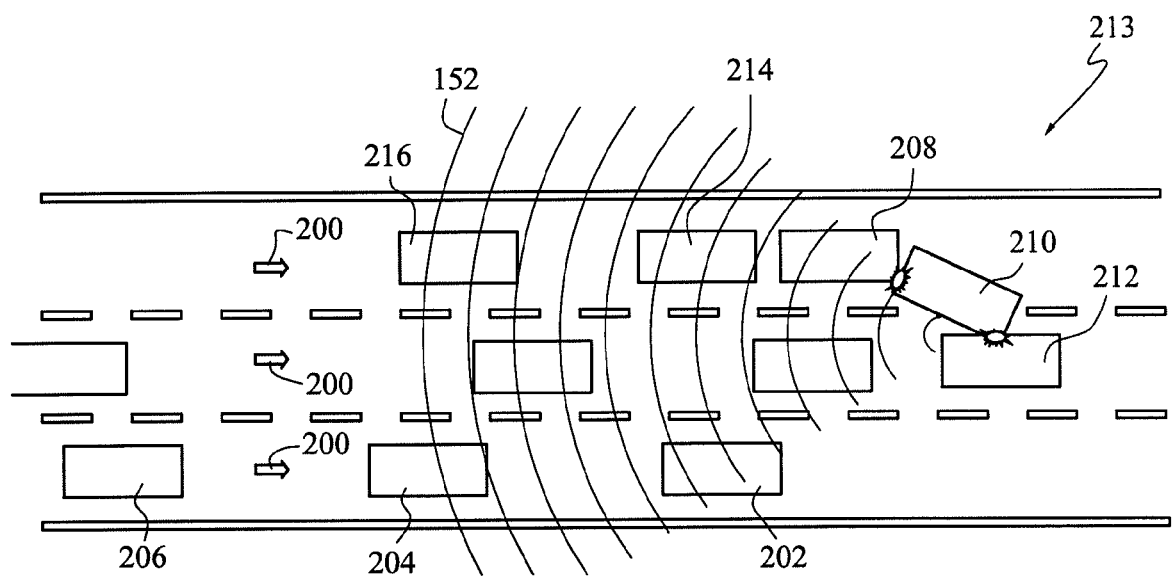
FIG. 6 is a second plan view of motor vehicles carrying embodiments of the invention.

FIGS. 5 and 6 illustrate two traffic situations in which embodiments of crash warning systems can be effective to provide an increment of advance warning of an accident, and additional time in which an operator of a vehicle may take evasive action. In FIG. 5, the original direction of travel for vehicle 192 is indicated by arrow 194, and the direction of travel for vehicle 196 is indicated by arrow 198. Vehicle 192 is illustrated as having hit an obstruction that caused air-bag deployment. As a consequence of the air-bag deployment, a crash warning system carried in vehicle 192 also broadcast a remote warning signal 152 effective to convey an accident warning to all cooperating vehicles within broadcast reach. Therefore, the operator of vehicle 196 is forewarned, and may employ a suitable amount of caution in the vicinity of the accident. Note that for efficiency of space utilization on the sheet, only one-half of the symmetrical broadcast signal 152 is illustrated. Because the resting orientation of a vehicle subsequent to a crash is indeterminate, it is currently preferred that a broadcast signal, such as signal 152, be effectively broadcast in all directions of the compass.

FIG. 6 illustrates a common traffic situation in which the direction of traffic motion is indicated by arrows 200. Vehicles 202, 204, and 206 are spaced apart by about the minimum safe distance for operation at the speed of the illustrated traffic. Somehow, vehicles 208, 210, and 212 just became involved in an accident, generally 213, and an air-bag was deployed in at least vehicle 212, which caused broadcast of remote warning signal 152. While vehicle 214 may not be able to stop in time to avoid joining the accident, vehicle 216 may receive warning signal 152 and gain an additional increment of time sufficient to avoid the accident.

Once a crash happens, it is currently contemplated that a crash warning system, such as crash warning system 100, should be structured to transmit a remote warning signal 152 for a mandatory period of time, to ensure approaching vehicles are sufficiently warned. An exemplary such mandatory period of time may be about 2 minutes. Then, the operator of the transmitting vehicle should be able to stop the signal, if there is no more risk of collision. For example, a crash warning system may be interrupted by pressing a "reset" button, or on/off button associated with a local display screen inside the crashed vehicle. If the operator is unconscious or unable to push the "Reset" button, the signal 152 may remain switched-on until a third person interferes.

What is claimed is:

1. An apparatus, comprising:
a first accident detector structured to be carried on board a first motor vehicle and adapted to detect an accident involving the first motor vehicle and to consequently cause a first output;
a first transmitter in communication with the first accident detector and operable to broadcast a first remote warning signal subsequent to receiving the first output;
a first receiver structured to be carried on board the first motor vehicle and operable to receive a second remote warning signal that is transmitted by a different apparatus; and
a first local warning device in communication with the first receiver and effective to communicate a warning, corresponding to the second remote warning signal, to an occupant disposed inside the first motor vehicle, wherein the first local warning device is structured to determine and visually convey an approximate current state of intensity, selected from a plurality of different states of intensity, of an attribute associated with the second signal, wherein:
a plurality of audible noises are individually assigned to each one of the states of intensity; and
a speaker associated with the apparatus is configured to broadcast one noise, selected from the noises and corresponding to the currently determined state, for audible perception of the one noise by an occupant of the first vehicle.

2. The apparatus according to claim 1, further comprising:
a second accident detector structured to be carried on board a second motor vehicle and adapted to detect an accident involving the second motor vehicle and to consequently cause a second output;
a second transmitter in communication with the second accident detector and operable to broadcast the second remote warning signal subsequent to receiving the second output;
a second receiver structured to be carried on board the second motor vehicle and operable to receive the first remote warning signal; and
a second local warning device in communication with the second receiver and effective to communicate a warning, corresponding to the first remote warning signal, to an occupant disposed inside the second motor vehicle.

3. The apparatus according to claim 1, wherein:
the first accident detector is disposed in-circuit to receive an input from a component of air-bag deployment circuitry of the first motor vehicle.

4. The apparatus according to claim 1, further comprising:
a warning light structured to be carried on board the first motor vehicle and adapted to broadcast a warning light output, which is configured to be visible to an occupant of an approaching vehicle, responsive to an output of the first accident detector.

5. The apparatus according to claim 4, wherein:
the warning light is adapted to be carried on top of a roof of the first motor vehicle.

6. The apparatus according to claim 4, wherein:
the warning light comprises an element selected from the group consisting of: a brake light; a turn signal; and a headlight; of the first motor vehicle.

7. The apparatus according to claim 1, further comprising:
an alarm structured to be carried on board the first motor vehicle and adapted to broadcast an audible warning, for perception of the audible warning by an occupant of an approaching motor vehicle, responsive to an output of the first accident detector.

8. The apparatus according to claim 7, further comprising:
a warning light structured to be carried on board the first motor vehicle and adapted to broadcast a visible warning light output, for perception of the warning light output by an occupant of an approaching motor vehicle, responsive to an output of the first accident detector.

9. The apparatus according to claim 1, wherein:

the first local warning device comprises a screen on which a printed message may be displayed for observation by an operator of the first motor vehicle.

10. The apparatus according to claim 1, wherein:
the first display device further comprises a screen on which a printed message may be displayed, for observation by a driver of the first motor vehicle, responsive to the second signal.

11. The apparatus according to claim 10, wherein:
the message is selected from a plurality of pre-programmed messages based upon a characteristic of the second signal.

12. The apparatus according to claim 1, wherein:
a transmission range for the first transmitted signal is adjustable based upon conditions disposed in the location of a crash.

13. The apparatus according to claim 1, wherein:
the first transmitter is disposed in-circuit operably to rebroadcast the second remote warning signal.

14. An apparatus, comprising:
a first accident detector structured to be carried on board a first motor vehicle and adapted to detect an accident involving the first motor vehicle and to consequently cause a first output;
a first transmitter in communication with the first accident detector and operable to broadcast a first remote warning signal subsequent to receiving the first output;
a first receiver structured to be carried on board the first motor vehicle and operable to receive a second remote warning signal that is transmitted by a different apparatus;
a first local warning device in communication with the first receiver and effective to communicate a warning, corresponding to the second remote warning signal, to an occupant disposed inside the first motor vehicle; and
an over-ride control operable to stop broadcast of a signal from the apparatus, the over-ride control structured to be operable only after a first pre-programmed period of time has elapsed subsequent to first broadcast of the signal.

15. A crash warning system comprising:
a crash detector operable to generate an input signal resulting from a crash involving a motor vehicle in which the crash detector is carried, the crash detector comprising a component of an air-bag deployment control assembly of the motor vehicle that is effective to cause the input signal responsive to air-bag deployment caused by the crash;
a transmitter in communication with the crash detector and operable to broadcast a first remote warning signal subsequent to receiving the input signal;
a receiver structured to receive a second remote warning signal from a different crash warning system;
a display device in communication with the receiver and effective to communicate a local warning, corresponding to the second remote warning signal, to an occupant of the motor vehicle, the display device structured to visually convey an estimate of the distance to a broadcast location of the second remote warning signal;
an alarm adapted to broadcast an audible warning, for perception of the audible warning by an occupant of an approaching motor vehicle, responsive to the input signal; and
a warning light adapted to broadcast a visible warning light output, for perception of the warning light output by an occupant of an approaching motor vehicle, responsive to the input signal; and
a speaker operably associated with the crash warning system to broadcast a noise corresponding to the currently displayed distance, wherein a plurality of audible noises are individually assigned to a corresponding plurality of discrete distance estimates.

* * * * *